United States Patent
Shaya

(10) Patent No.: US 10,832,656 B1
(45) Date of Patent: Nov. 10, 2020

(54) COMPUTING DEVICE AND METHOD FOR POPULATING DIGITAL FORMS FROM UN-PARSED DATA

(71) Applicant: Fawzi Shaya, Orchard Lake, MI (US)

(72) Inventor: Fawzi Shaya, Orchard Lake, MI (US)

(*) Notice: Subject to any disclaimer, the term of this patent is extended or adjusted under 35 U.S.C. 154(b) by 0 days.

(21) Appl. No.: 16/800,416

(22) Filed: Feb. 25, 2020

(51) Int. Cl.
  *G10L 15/26* (2006.01)
  *G10L 15/04* (2013.01)
  *G10L 15/02* (2006.01)
  *G06N 20/00* (2019.01)
  *G10L 15/08* (2006.01)

(52) U.S. Cl.
  CPC .............. *G10L 15/04* (2013.01); *G06N 20/00* (2019.01); *G10L 15/02* (2013.01); *G10L 15/08* (2013.01); *G10L 15/26* (2013.01); *G10L 2015/088* (2013.01)

(58) Field of Classification Search
  CPC .. G06F 16/248; G06F 16/211; G06F 16/2477; G06F 16/258; G06F 16/26; G06F 16/958; G06F 3/04842; G06F 40/10; G06F 40/166; G06F 40/295; G06F 40/14; G06F 40/1149; G06F 40/169; G06F 40/174; G06F 40/177; G06F 40/205; G06F 40/226; G06F 40/30; G06F 40/48; G06K 2209/01; G06K 9/273; G06T 2200/24; G10L 13/027; G10L 13/043; G10L 13/08; G10L 15/22; G10L 15/30; G10L 19/018; Y01S 707/99943; G07G 1/0009; H04W 4/023
  USPC ...... 704/270, 231, 235; 707/999.1, 999.102; 709/223; 382/187; 715/235, 236, 249, 715/255, 264, 273, 277; 717/110, 140
  See application file for complete search history.

(56) References Cited

U.S. PATENT DOCUMENTS

| | | | | |
|---|---|---|---|---|
| 6,285,786 B1 * | 9/2001 | Seni | .................... | G06K 9/00879 382/187 |
| 7,158,990 B1 * | 1/2007 | Guo | ...................... | G06F 40/149 |
| 7,644,361 B2 * | 1/2010 | Wu | .................... | G06F 16/90324 715/273 |
| 8,032,860 B2 * | 10/2011 | Piehler | ..................... | G06F 40/10 717/110 |
| 8,065,143 B2 * | 11/2011 | Yanagihara | ............. | G10L 15/26 455/563 |
| 9,378,732 B2 | 6/2016 | Hakkani-tur et al. | | |
| 9,501,467 B2 * | 11/2016 | Light | ..................... | G06F 40/295 |
| 9,626,955 B2 * | 4/2017 | Fleizach | ............... | G10L 19/018 |
| 9,666,182 B2 | 5/2017 | Hakkani-tur et al. | | |
| 10,069,892 B2 * | 9/2018 | Wu | ......................... | G06F 16/211 |
| 2004/0015783 A1 * | 1/2004 | Lennon | ................. | G06F 16/242 715/235 |
| 2005/0114771 A1 * | 5/2005 | Piehler | ..................... | G06F 40/10 715/264 |

(Continued)

*Primary Examiner* — Vijay B Chawan

(74) *Attorney, Agent, or Firm* — Neal, Gerber & Eisenberg LLP

(57) ABSTRACT

A computing device is disclosed which includes a processor and non-transient memory operably connected to the processor. The non-transient memory includes instructions that, when executed by the processor cause the processor to extract a plurality of sub-strings from a character string, analyze each sub-string for compliance with each of several field definitions, where each of the field definitions corresponds to a field in a digital form, and populate some of the fields in the digital form based on the analysis of each sub-string for compliance with the field definitions.

22 Claims, 9 Drawing Sheets

(56) References Cited

U.S. PATENT DOCUMENTS

| | | | |
|---|---|---|---|
| 2006/0106610 A1* | 5/2006 | Napper | G06K 9/726 |
| | | | 704/270 |
| 2015/0039651 A1* | 2/2015 | Kinsely | G06F 16/254 |
| | | | 707/779 |
| 2016/0094681 A1* | 3/2016 | Wu | G06F 16/958 |
| | | | 709/203 |
| 2017/0139887 A1* | 5/2017 | Miller | G06F 16/2477 |
| 2017/0140039 A1* | 5/2017 | Neels | G06F 16/2477 |
| 2017/0330153 A1* | 11/2017 | Muhammedali | G06Q 10/10 |
| 2018/0260813 A1* | 9/2018 | Pi Farias | G06K 7/10881 |
| 2018/0260814 A1* | 9/2018 | Pi Farias | G06Q 20/3278 |
| 2019/0034407 A1* | 1/2019 | Hagiwara | G06F 40/295 |

* cited by examiner

COMPUTING DEVICE AND METHOD FOR POPULATING DIGITAL FORMS FROM UN-PARSED DATA

FIELD

This disclosure is directed to computer-based methods for entering and categorizing data.

BACKGROUND

Speech-recognition application are well-known in the computing arts. Many such applications are derived from or informed by applying machine-learning techniques to audio data and associated text data. Such speech-recognition applications may be used in some instances to enter data into digital forms and data structures. However, existing technologies pose several limitations that degrade the user experience when used for entering data into digital forms and data structures.

SUMMARY

The disclosed technology address several of the limitations when present speech-recognition technology is applied to entering data into digital forms and data structures. For example, other voice dictation solutions require the user to select each field before speaking. The disclosed solution allows a user to speak out loud the values to all fields in a form without interruption. Additionally, the disclosed technology allows a user to correct fields based on the overall context of the form or other fields, which other solutions to not allow.

A computing device is disclosed which includes a processor and non-transient memory operably connected to the processor. The non-transient memory includes instructions that, when executed by the processor cause the processor to extract a plurality of sub-strings from a character string, analyze each sub-string for compliance with each of several field definitions, where each of the field definitions corresponds to a field in a digital form, and populate at least some of the fields in the digital form based on the analysis of each sub-string for compliance with the field definitions.

In some examples, the method further includes recognizing a plurality of target keywords in the character string and extracting the sub-strings based on the target keywords. In some examples, the character string is generated by applying a speech recognition algorithm to audio data, which may include a user's speech. In some examples, analyzing each sub-string occurs in real-time while the user speaks. In some examples, each of the plurality of field definitions may include a field name, a data type, and/or a size limit. In other examples, the plurality of field definitions may include target keywords associated with the plurality of fields in the digital form.

In some examples, analyzing each sub-string for compliance with each of a plurality of field definitions may include applying a pattern-recognition algorithm to the sub-strings and the field definitions. In some examples, the pattern-recognition algorithm may be generated using machine learning.

In additional examples, the fields in the digital form may be populated in real-time while the user speaks. In some examples, the plurality of fields may be populated based on a numerical score generated by analyzing each sub-string for compliance with each of the plurality of field definitions. The numerical score may be generated by a pattern-recognition algorithm. In some examples the method may also include retrieving the pattern-recognition algorithm from a remote server or from the non-transient memory. In some examples, the method may also include retrieving the digital form and the plurality of field definitions from a remote server or from the non-transient memory. In some examples, the field definitions may be generated based on the digital form.

DETAILED DESCRIPTION

In one example use, the disclosed technology may be used for numerous use cases where new data needs to be entered quickly or in a hands-free manner. In this example use, the disclosed technology allows a user to engage a voice-dictation function in an application for the purpose of filling out the form fields. Artificial intelligence in the application extracts contextual data from the user's speech and then fills in the fields of the form using the contextual data from the voice dictation. However, the disclosed technology is not limited to speech-recognition technologies and may be applied to many data-characterization tasks.

Figure 1:
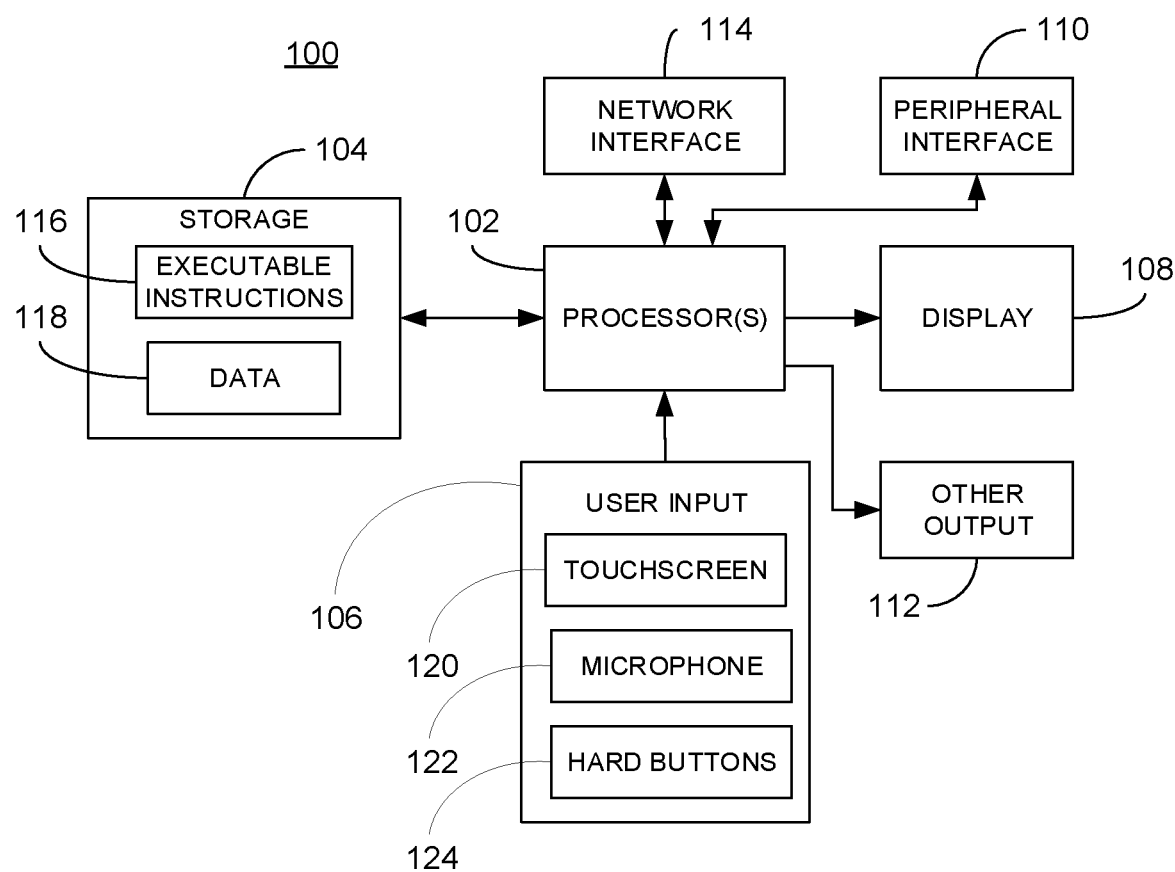
FIG. 1 is a block diagram illustrating one example of a computing device suitable for implementing the disclosed technology, in accordance with the present disclosure.

Referring now to the Figures, in which like reference numerals represent like parts, various examples of the computing devices and methods will be disclosed in detail. FIG. 1 is a block diagram illustrating one example of a computing device 100 suitable for implementing the disclosed technology.

FIG. 1 illustrates a representative computing device 100 that may be used to implement the teachings of the instant disclosure. The device 100 may be used to implement, for example, one or more components of the system shown in FIG. 4, as described in greater detail below. As another example, the device 100 may be used to implement the methods of FIG. 2 or FIG. 3, as described in greater detail below. The device 100 includes one or more processors 102 operatively connected to a storage component 104. The storage component 104, in turn, includes stored executable instructions 116 and data 118. In an example, the processor (s) 102 may include one or more of a microprocessor, microcontroller, digital signal processor, co-processor or the like or combinations thereof capable of executing the stored instructions 116 and operating upon the stored data 118. Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, flash memory, etc. Processor and storage arrangements of the types illustrated in FIG. 1 are well known to those having ordinary skill in the art. In one example, the processing techniques described herein are implemented as a combination of executable instructions and data within the storage component 104.

As shown, the computing device 100 may include one or more user input devices 106, a display 108, a peripheral interface 110, other output devices 112, and a network interface 114 in communication with the processor(s) 102. The user input device 106 may include any mechanism for providing user input to the processor(s) 102. For example, the user input device 106 may include a keyboard and mouse or any other means whereby a user of the device 100 may provide input data to the processor(s) 102. As another example, the user input device 106 of a smartphone or tablet may include a touch screen 120, microphone 122 and suitable voice recognition application, and physical "hard" buttons 124. The display 108 may include any conventional display mechanism such as a cathode ray tube (CRT), flat panel display, projector, or any other display mechanism known to those having ordinary skill in the art. In an example, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk, solid state, or optical disk drives), other processing devices, or any other input source used in connection with the instant techniques. For example, the peripheral interface may be a Universal Serial Bus (USB). Likewise, the other output device(s) 112 may optionally include similar media drive mechanisms, other processing devices, or other output destinations capable of providing information to a user of the device 100, such as speakers, LEDs, tactile outputs, etc. Finally, the network interface 114 may include hardware, firmware, and/or software that allows the processor(s) 102 to communicate with other devices via wired or wireless networks, whether local or wide area, private or public, as known in the art. For example, such networks may include the World Wide Web or Internet, or private enterprise networks, as known in the art.

While the computing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

Figure 2:
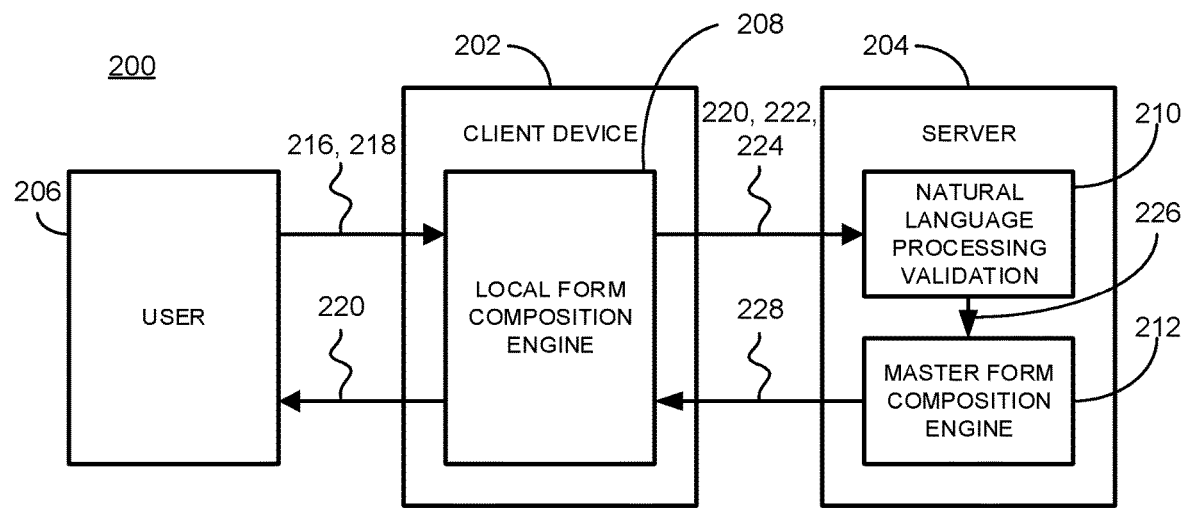
FIG. 2 is an illustration of one example of the relationship between a client device and the server during the initial population of a form, in accordance with the present disclosure.

FIG. 2 is an illustration of one example of the relationship 200 between a client device 202 and the server 204 during the initial population of a form. In this example, form composition is completed solely on the local client device. A user 206 inputs audio data 216 and/or touch data 218 into the client device 202. The local form composition engine 208 analyzes the user data and locally populates the form. The completed form 220 is then displayed for the user. In the background, the client device 202 transmits the populated form 220, the character string 222, and the audio data 224 (if any) to the server 204. At the server 204, the natural language processing validation engine 210 validates the populated form 220 against the character string 222, and the audio data 224 (if any). The natural language processing validation engine 210 than passes the validated form data 226 to the master form composition engine 212. The master form composition engine 212 uses the validated form data 226 to update the master form composition algorithm 228, which is returned to the local form composition engine 208 on the client device 208 for use composing future forms.

Figure 3:
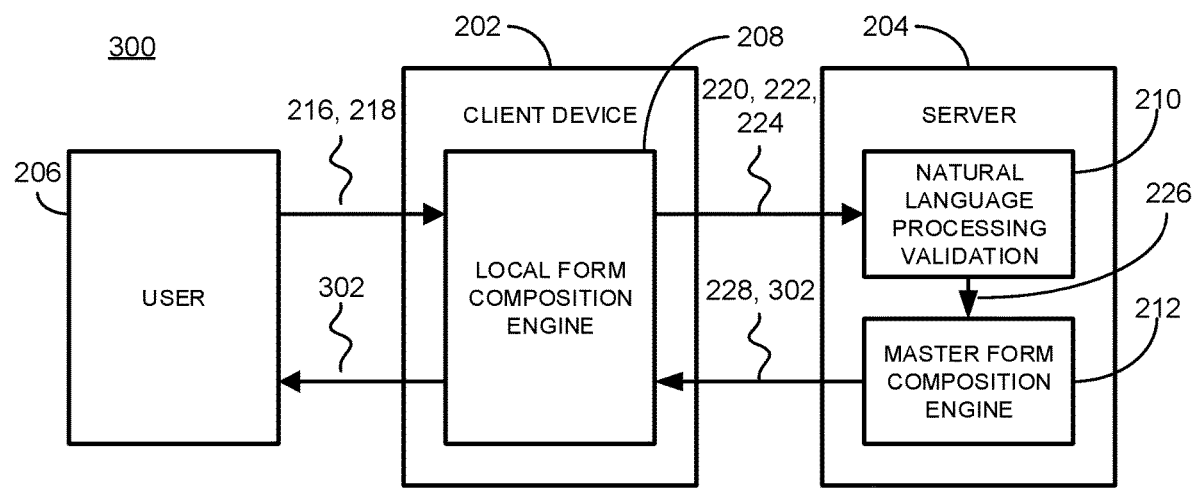
FIG. 3 is an illustration another example of a relationship between a client device and the server during the initial population of a form, in accordance with the present disclosure.

FIG. 3 is an illustration another example of a relationship 300 between a client device 202 and the server 204 during the initial population of a form. In this example, form composition is completed jointly between the local client device and the server. A user 206 inputs audio data 216 and/or touch data 218 into the client device 202. The client device 202 transmits the locally-populated form 220, the character string 222, and the audio data 224 (if any) to the server 204. At the server 204, the natural language processing validation engine 210 validates the populated form 220 against the character string 222, and the audio data 224 (if any). The natural language processing validation engine 210 then passes the validated form data 226 to the master form composition engine 212. The master form composition engine 212 uses the validated form data 226 to generate a server-validated populated form 302 and to update the master form composition algorithm 228, which are both returned to the local form composition engine 208 on the client device 208. The server-validated populated form 302 is then displayed on the client device for the user.

Figure 4:
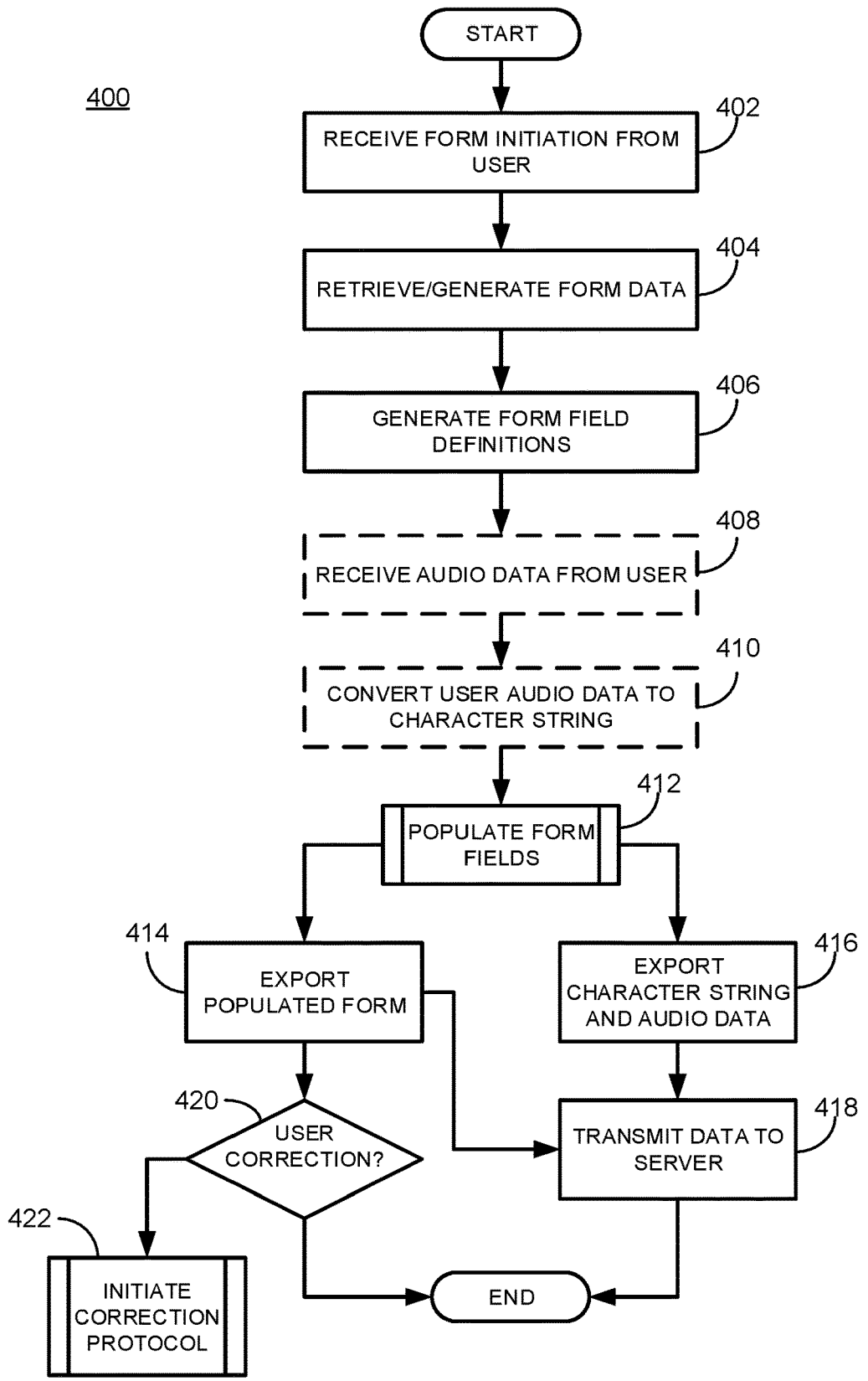
FIG. 4 is an illustration of one example of the form populating engine on the client device, in accordance with the present disclosure.

FIG. 4 is an illustration of one example of the form populating engine 400 on the client device. Form population begins at 402 when the client device receives a form initiation request from the user. Form initiation may take several forms. In one example, it may be a touchscreen or hard button press. In another example, it may be a voice command, for example "start dictation." At 404 the client device retrieves or generates form data. In one example, form data may be retrieved from a server or the Internet. In another example, form data may be stored locally on the client device. In another example, form data may be generated locally based on the use context. In another example, the client device could generate a new form based on who the user is and its location, for example based on GPS or local WiFi. For example, if the user is an EMT and GPS indicates a nursing home, one form might be generated. Or, if the user is an RN and the client is connected to the WiFi in a hospital ER, a different form might be generated. Form data includes enough information to generate definitions for each of the fields to be included in the form. In one example, form data may be a list of form fields. In another example, form data may be an image of a paper form. In another example, form data may be a web-based (e.g. HTML) form.

At 406 the client device generates definitions for the form fields. In one example, the form field definitions may be part of the form data retrieved or generated in the previous step. In another example the machine learning algorithm may generate form field definitions based on less specific form data. The form field definitions may include information such as the name of the fields, the type of data to be put in the fields (text or numerical), and the size of the fields (e.g. in bytes or characters). At 408, in some examples the client device may receive audio data from the user as spoken words. In such examples, at 410 the client device then converts the user audio data into a continuous character string. At 412 the client device populates the form fields based on the character string and the local form-population algorithm. At 414 the client device exports the populated form to both the display and to the remote server. Simultaneously with 414, at 416 the client device also exports the character string data and any audio data to the server. At 418 the populated form, character string data, and any audio data are all transmitted to the server. At 420 the client device may prompt the user or wait for the user to indicate that one or more the populate form field requires correction. If correction is required, at 422 the correction protocol is initiated. If correction is not required the user can conclude the process and submit the form.

Figure 5:
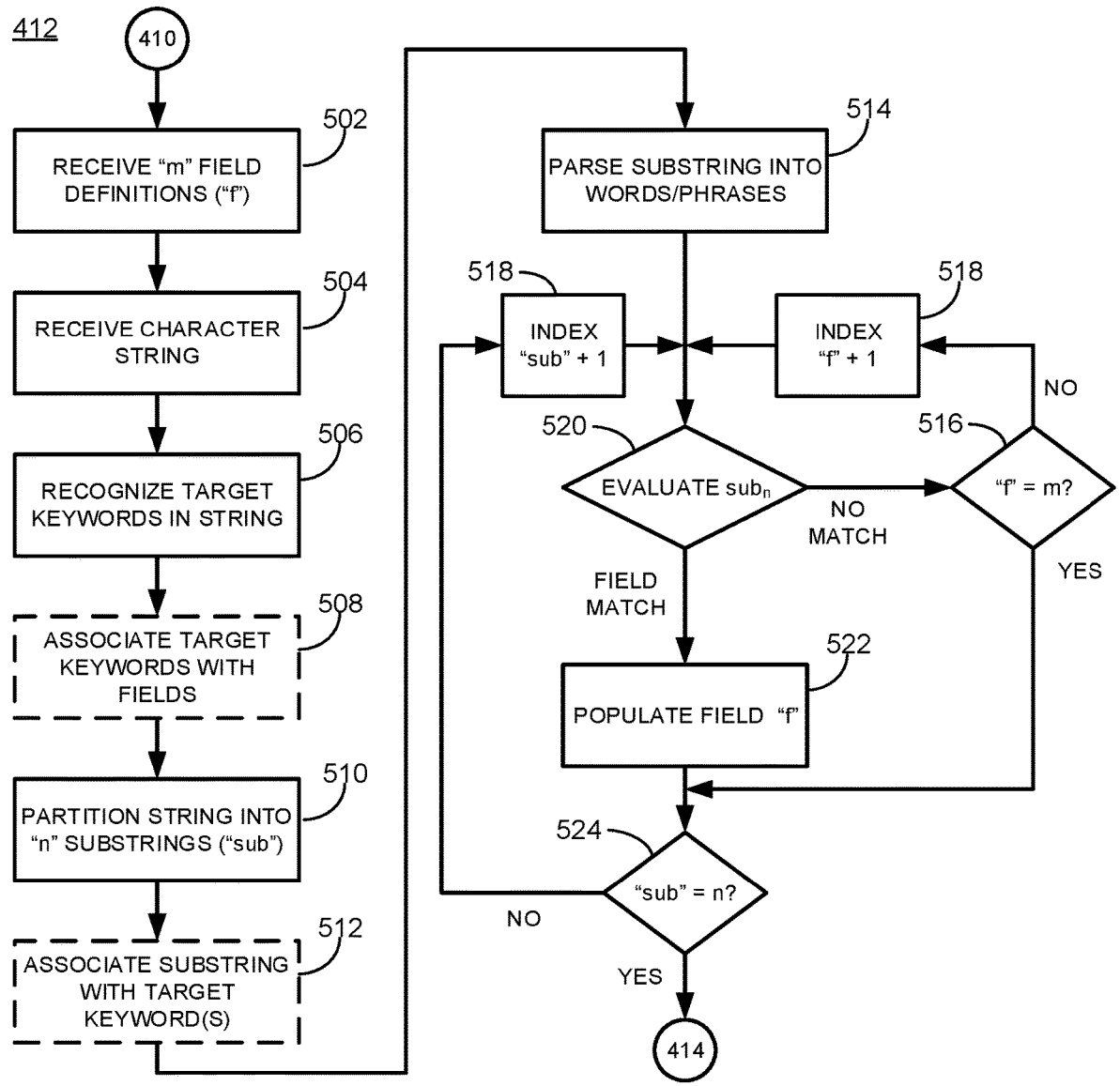
FIG. 5 is an illustration of one example of the field population process, in accordance with the present disclosure.

FIG. 5 is an illustration of one example of the field population process 412. At 502 a number, "m," of field definitions ("f") are received. At 504 a continuous character string is received. The character string includes the data to be classified and entered into the fields of the form. In one example, the character string may be a paragraph-style narration. In another example, the string may be delineated into sub-sections, with or without field names or punctuation. In some examples the character string may have been converted from audio data gathered from the user. At 506, the engine recognizes target keywords within the string. At 508, in some examples, the engine may associate the target keywords with certain fields. This process may be based on a machine learning algorithm. In other examples, the field definitions may include target keywords. In other examples, the engine may use a combination of target keywords in the field definitions and learned associations between target key words and the fields. At 510 the character string is partitioned into "N" substrings ("sub") delineated by the target keywords. At 512, in some examples, the engine may associate each substring with one or more of the target keywords. For example, a substring may be associated with the preceding target keyword or the following target keyword or both. Longer substrings are more likely to be associated with multiple target keywords. In other examples the engine may evaluate the substring independently of the target keywords. In such examples the target keywords serve only to extract the substrings. In the context of this application, target keywords may include both individual words and phrases.

At 514, the substring is parsed into individual words and/or phrases to be evaluated. At 520 a particular parsed substring is evaluated for a particular field definition. If the substring includes an acceptable match for the field definition, that field will be populated based on that substring at 522. The number of field definitions to be evaluated may be limited based on the outcome of steps 508 and 512, if these steps are used in a particular example. If the substring does not include not an acceptable match for the field definition under consideration, the process will evaluate at 516 whether all of the field definitions have been considered. If any field definitions have not been considered for the present substring, the process will index to next the field definition at 518. If the engine has evaluated the substring against all the field definitions, then the process continues. At 524, the process checks whether all of the substrings have been evaluated. If all of the substrings have been evaluated, the process terminates. If all the substrings have not been evaluated, the process begins again with the next substring at 518.

Figure 6:
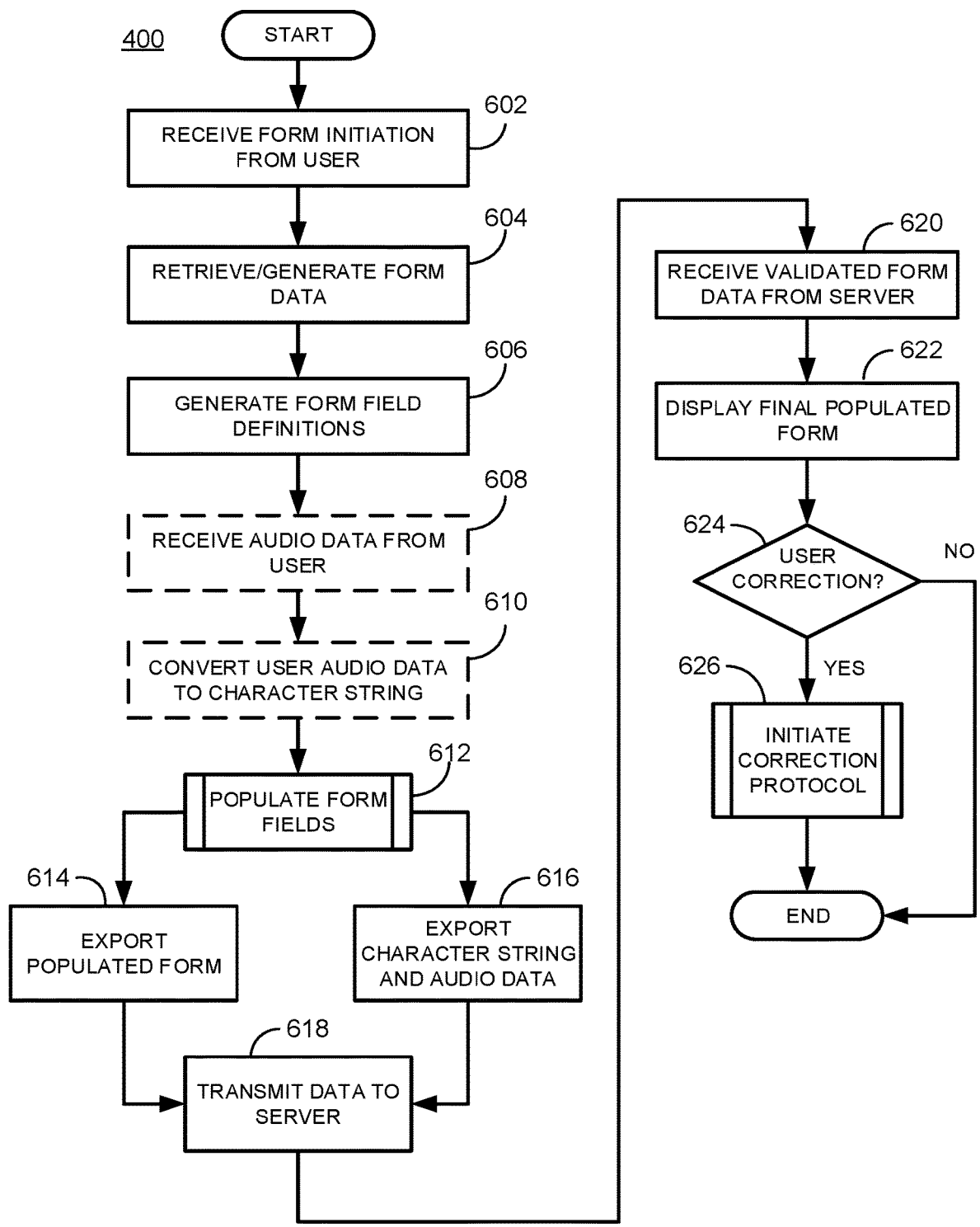
FIG. 6 is an illustration of another example of the form populating engine, where form-population activity is shared between the client device and the server, in accordance with the present disclosure.

FIG. 6 is an illustration of another example of the form populating engine 600, where form population is shared between the client device and the server, as illustrated in FIG. 3. FIG. 6 is limited to the client-side aspects of the process; it does not include the actions taking place on the server. Form population begins at 602 when the client device receives a form initiation request from the user. Form initiation may take several forms. In one example, it may be a touchscreen or hard button press. In another example, it may be a voice command, for example "start dictation." At 604 the client device retrieves or generates form data. In one example, form data may be retrieved from a server or the Internet. In another example, form data may be stored locally on the client device. In another example, form data may be generated locally based on the use context. Form data includes enough information to generate definitions for each of the fields to be included in the form. In one example, form data may be a list of form fields. In another example, form data may be an image of a paper form. In another example, form data may be a web-based (e.g. HTML) form.

At 606 the client device generates definitions for the form fields. In one example, the form field definitions may be part of the form data retrieved or generated in the previous step. In another example the machine learning algorithm may generate form field definitions based on less specific form data. The form field definitions may include information such as the name of the fields, the type of data to be put in the fields (text or numerical), and the size of the fields (e.g. in bytes or characters). At 608, in some examples the client device may receive audio data from the user as spoken words. In such examples, at 610 the client device then converts the user audio data into a continuous character string. At 612 the client device populates the form fields based on the character string and the local form-population algorithm. At 614 the client device exports the populated form to both the display and to the remote server. The populated fields displayed at this point in the process are temporary, until validated data is returned from the server. Simultaneously with 614, at 616 the client device also exports the character string data and any audio data to the server. At 618 the populated form, character string data, and any audio data are all transmitted to the server. At 620 the client device receives a server-validated populated form from the server. At 622, the server-validated populated form is displayed for the user. At 624 the client device may prompt the user or wait for the user to indicate that one or more of the populated form field requires correction. If correction is required, the correction protocol is initiated at 622. If correction is not required the user can conclude the process and submit the form.

Figure 7:
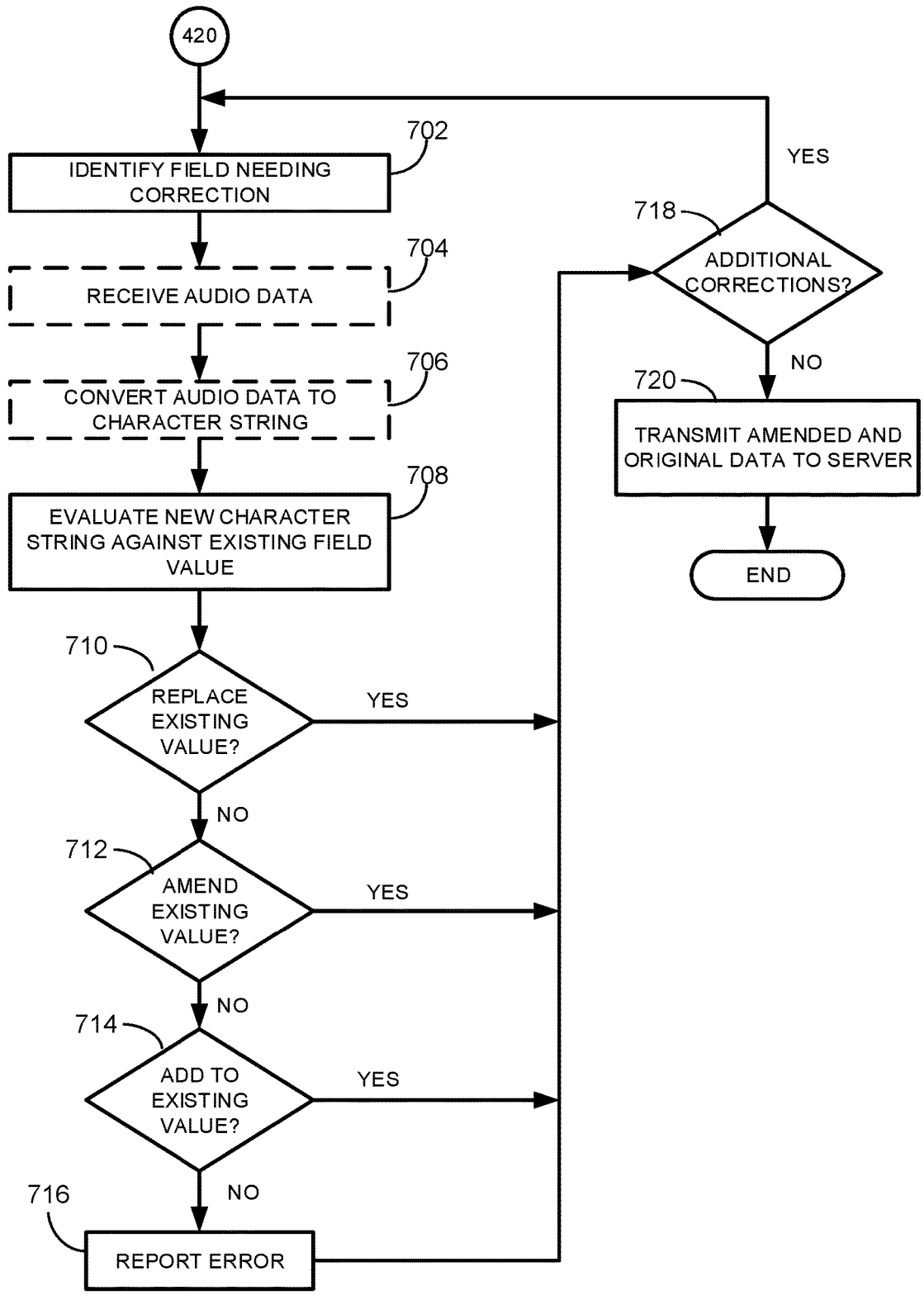
FIG. 7 is an illustration of an example process for user correction of improperly transcribed data in a populated form, in accordance with the present disclosure.

FIG. 7 is an illustration of an example process for user correction of improperly transcribed data in a populated form. At 702 a field requiring correction is identified. In one example, the user may identify a field requiring correction by tapping or clicking on the field using a touchscreen, mouse, or similar pointing device. In another example, the user may identify a field requiring correction using voice commands, e.g., "Correct 'Family Name.'" In some examples, at 704 the client device receives user audio/speech data. In those examples, at 706 the user audio/speech data is converted into a character string. A character string representing the correction may be received in other ways as well, for example using a text-entry feature on a touchscreen or using a traditional keyboard. At 708, the new character string is evaluated against the existing field value. This evaluation may include one or more of the following steps. At 710 the process evaluates whether the new character string should replace the entire current value of the field to be corrected. At 712 the process evaluates whether the new character string should replace or amend a portion of the current value of the field to be corrected. At 714 the process evaluates whether the new character string should be added to the current value of the field to be corrected. If the process cannot determine an appropriate correction an error message is generated at 716. At 718 the process may prompt the user or wait for additional corrections. At 720 the client device transmits the corrected and original forms to the server for use in training the master machine-learning algorithm.

Figure 8:
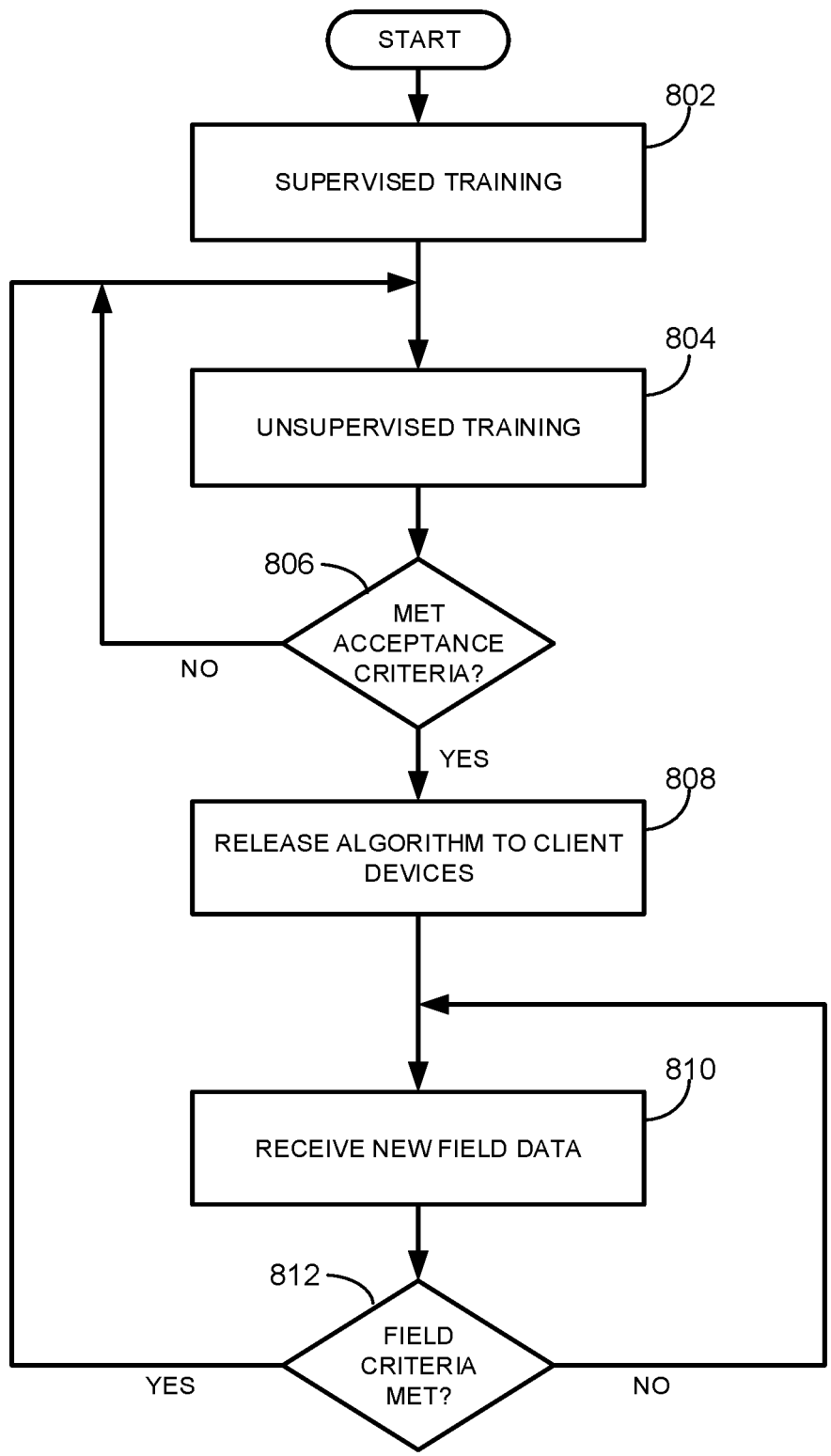
FIG. 8 is an illustration of a continuous machine-learning process that can be used as part of the disclosed technology, in accordance with the present disclosure.

FIG. 8 is an illustration of a continuous machine-learning process 800 that can be used as part of the disclosed technology. The illustrated process can be used to develop and continuously improve machine-learning generated algorithms for both populating defined form fields and generating definitions for form fields. The process begins, in some examples, at 802 with supervised training, as will be understood by those skilled in the art. For form-populating algorithms the relevant datasets may include fully populated and partially populated forms and representative character strings containing the data from which the fully and partially-populated forms were filled. The forms and the source character strings from which their field data come may or may not be expressly linked. For field-defining algorithms datasets may include fully-defined sets of form fields and various types of source material, including but not limited to internet-based forms, lists of form fields, and text strings generated by analyzing images of forms using optical character recognition (OCR). Datasets for field-defining algorithms may also include fully-populated forms. Numerous established machine-learning techniques may be applied, including: artificial neural networks (including deep neural networks), regression analysis, cluster analysis, decision tree analysis, combinations of the preceding methods, and others as will be understood by those skilled in the art.

In examples using supervised learning, the process continues on to unsupervised learning at 804, as will be understood by those skilled in the art. In other examples, the machine learning process may begin with unsupervised training. At 806 the process evaluates whether acceptance criteria have been met. For example, the process may have a minimum value(s) for correctness or convergence or a maximum error rate. Other acceptance criteria may also be used. If the acceptance criteria are not met, the process returns for additional unsupervised learning. If the acceptance criteria is met, the trained machine-learning algorithm is released at 808 for use in client devices. At 810 field data is received from client devices as described elsewhere in this disclosure. At 812 field data is evaluated against criteria for inclusion in algorithm training. In one example, a minimum amount of data or number of representative samples may be required before field data is included in the unsupervised learning process at 804. In another example, a data-quality requirement may be set for the field data. If the criteria is not met, field data continues to accumulate until the criteria is met.

Figure 9:
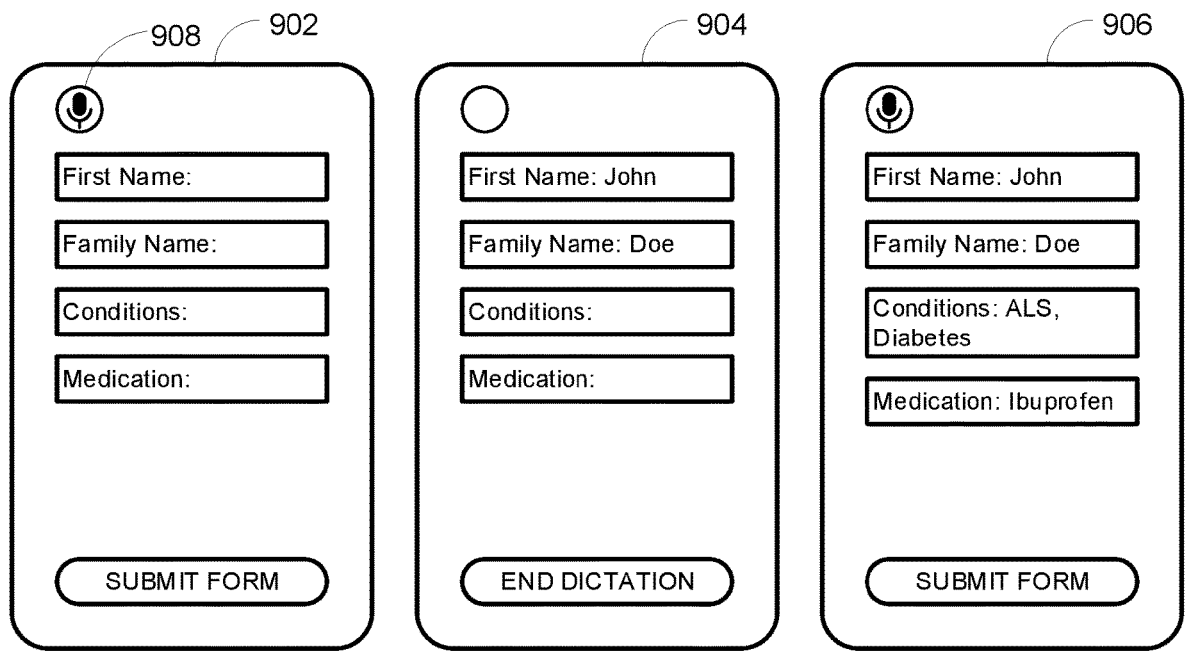
FIG. 9 is an illustration of a representative user interface during population of a form using audio data, in accordance with the present disclosure.

FIG. 9 is an illustration of a representative user interface during population of a form using audio data. At 902 a user starts voice dictation using a voice button 908. In this example, the user may then start to speak: "My name is John Doe and I have Amyotrophic lateral sclerosis conditions, I have taken an Advil and I have Diabetes also." At 904 the client device displays a preview using a locally-trained model while user is speaking. The field values are previewed using a local voice-processing client and form-populating algorithm. In addition, the populated form is sent to the server in real-time and the voice data is streamed to the server in real-time. At 906 user stops dictation using dedicated button, using a voice command, or by staying silent for defined period of time. The server then returns validated form field values based on the voice data stream and field preview values sent during the dictation phase in 904. If form fields values are incorrect, the user can correct field values using the same dictation button or by manually editing the field values. Correcting the field values will send the corrected field value and new voice dictation (if applicable) to the server for re-validation and if valid will send an update for the form fields value and also an update for the voice processing client local model on the device. Finally, the field values validated by the user are returned to the server to update the voice-processing server model.

The disclosure described in this application includes numerous data transmissions between a client computing device and a remote server. As will be understood by those skilled in the art, this data may include sensitive, confidential, and/or private information. This information may be governed by applicable laws or ethical obligations. For example, the use of unencrypted RTP is explicitly forbidden by the WebRTC specification. As such, appropriate digital security measures will be incorporated into the disclosed technology. For example, and not in limitation, the disclosed technology may use Secure Real-time Transport Protocol (SRTP). Basic RTP does not have any built-in security mechanisms, and thus places no protections of the confidentiality of transmitted data. For example, a SRTP key exchange may be initially performed end-to-end with DTLS-SRTP, allowing for the detection of any man-in-the-middle (MiTM) attacks, as will be understood by those skilled in the art.

Figure 10:
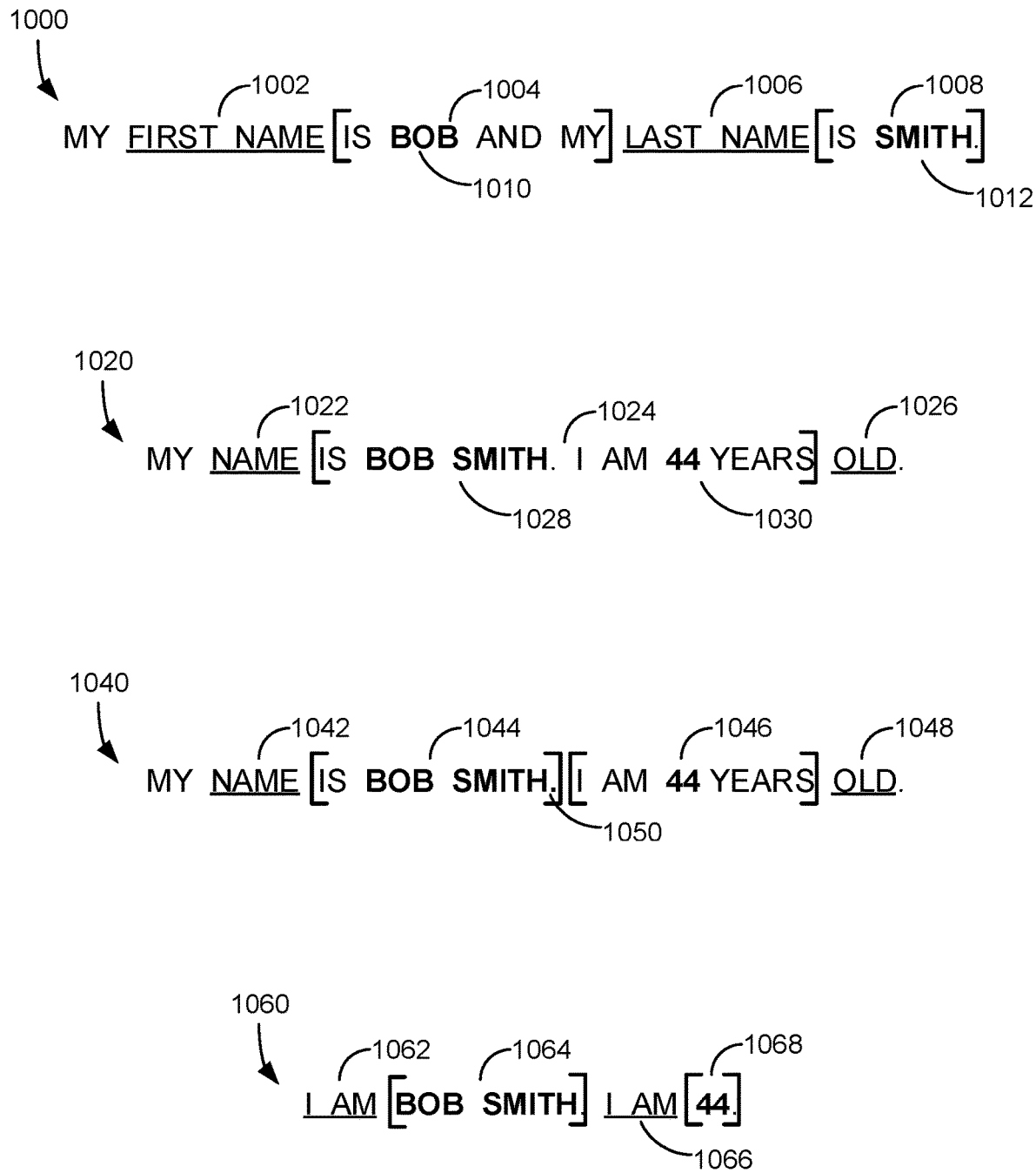
FIG. 10 is an illustration of several examples of how the form populating engine 400 partitions the character string into substrings.

FIG. 10 illustrates several examples of how the form populating engine 400 partitions the character string into substrings. At 1000 the engine analyzes the sentence "My first name is Bob and my last name is Smith." Within this sentence the engine recognizes target keywords "first name" 1002 and "last name" 1006. The engine then extracts the sub strings "is Bob and my" 1004 and "is Smith" 1008 from between the target keywords. Within these substrings the engine recognizes "Bob" 1010 as the value for the field "first name" and recognizes "Smith" 1012 as the value for the field "last name." In some examples, these target keywords may be associated with the fields of the same names.

At 1020 the engine analyzes the sentences "My name is Bob Smith. I am 44 years old." The engine recognizes the target keywords "name" 1022 and "old" 1026. The substring between these target keywords is: "is Bob Smith. I am 44 years" 1024. In one example, the engine may recognize "Bob Smith" 1028 within the substring as being correlated with the target keyword "name" 1022 and "44" 1030 as being associated with the target keyword "old" 1026. The engine may then further distinguish between "Bob" and "Smith" for the fields "first name" and "last name" associated with the target keyword "name" 1022.

At 1040 the engine analyzes the sentences: "My name is Bob Smith. I am 44 years old." However in this example the engine may utilize the period character 1050 to separate the text between the two target keywords into two substrings: "is Bob Smith" 1044 and "I am 44 years" 1046. Each substring can then be individually associated with a target keyword and/or analyzed for compliance with a field definition.

At 1060 engine analyzes the sentences "I am Bob Smith. I am 44." In this example, the same target keyword "I am" appears both at the beginning 1062 and in the middle 1066. In this example, the engine may extract the substrings "Bob Smith" 1064 and "44" 1068 but would face a greater challenge of associating each of the substrings to the target keywords and/or to the correct fields.

Example Narrative:

The following narrative provides one non-limiting example of how the disclosed technology may be employed. A Community Paramedic (CP) program may have existing hard-copy forms that the CPs manually fill out when a they visit new and existing patients, which would make this program a good candidate for the disclosed technology. Upon enrolling, the CP program may submit their desired forms to a service provider to be entered into the voice platform. The requested forms may then be created digitally, either manually or using a machine-learning algorithm, for use with the disclosed technology. The digital forms would include unique input fields for each question and/or data point. The digital forms would be made available to the CP program through access to its account. After the forms were set up per their requests, the CP may visit patients like before, but now may use the disclosed technology and not the paper form previously used.

In one example interaction, a CP may visit a new patient who has no previous data in the system. The CP might log into the CP program account to access the digital forms. The CP would select the desired form and talk with the patient to gather information. Before using, for example, the voice dictation feature, the CP would select one of two options: the CP may ask the patient all or part of the information and then dictate it in one phrase, or the CP may ask the patient questions and have the patient dictate the answer. In the first example, the CP may dictate the answers to the questions to the software in the following example: "The patient's name is Jane Doe, she is 58 years old, she lives at 1 Park Avenue, Cityville, USA, she suffers from type 2 diabetes and takes insulin regularly." The form would populate 'Jane Doe' under name, '58' under age, '1 Park Avenue Cityville, USA' under address, 'type 2 diabetes' under conditions, and 'insulin' under medications. If the system transcribes a spoken word incorrectly, such as '68' instead of '58' under the age field, the CP can either re-transcribe with the voice dictation feature to correct the error (e.g. dictating "patient's age is 58" in order to update the field) or they may manually type in the field with their user interface. The second example on a per-question workflow, the CP may ask the patient questions, such as What is your name?' In this example, the CP may begin the voice dictation option and the machine-learning algorithm may extract the patient's response when the patient says, "My name is Jane Doe."

Once the information has been entered into the fields and is considered satisfactory, the CP may save the results by either tapping/clicking the 'save form' button or by dictating "save form."

To facilitate an understanding of the principals and features of the disclosed technology, illustrative examples are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain examples of this technology are described above with reference to block and flow diagrams of computing devices and methods and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some examples of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Some examples of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing device comprising:
a processor;
non-transient memory operably connected to the processor, the non-transient memory comprising instructions that, when executed by the processor, cause the processor to perform a method comprising the following steps:
retrieving a digital form comprising a plurality of fields;
retrieving a plurality of field definitions associated with the plurality of fields;
generating a character string by applying a speech recognition algorithm to audio data comprising a user's speech;
recognizing a plurality of target keywords in the character string;
extracting a plurality of sub-strings from the character string based on the target keywords;
generating a numerical score by analyzing each sub-string for compliance with each of the plurality of field definitions, where each of the plurality of field definitions comprises a field name and a data type and corresponds to one of the plurality of fields in the digital form, where each sub-string is analyzed in real-time while the user speaks; and
populating a plurality of the fields in the digital form based on the numerical score generated during the analysis of each sub-string for compliance with each of the plurality of field definitions.

2. The computing device of claim 1, where each of the plurality of field definitions further comprises a size limit.

3. The computing device of claim 1, where the plurality of field definitions further comprises target keywords associated with the plurality of fields in the digital form.

4. The computing device of claim 1, where analyzing each sub-string for compliance with each of a plurality of field definitions comprises applying a pattern-recognition algorithm to the sub-strings and the field definitions.

5. The computing device of claim 4, where the pattern-recognition algorithm is generated using machine learning.

6. The computing device of claim 4, where the method further comprises retrieving the pattern-recognition algorithm.

7. The computing device of claim 6 where the pattern-recognition algorithm is retrieved from a remote server.

8. The computing device of claim 6 where the pattern-recognition algorithm is retrieved from the non-transient memory.

9. The computing device of claim 1, where populating the plurality of the fields in the digital form occurs in real-time while the user speaks.

10. The computing device of claim 1 where the digital form and the field definitions are retrieved from a remote server.

11. The computing device of claim 1 where the digital form and the field definitions are retrieved from the non-transient memory.

12. A computing device comprising:
a processor;
non-transient memory operably connected to the processor, the non-transient memory comprising instructions that, when executed by the processor, cause the processor to perform a method comprising the following steps:
retrieving a digital form comprising a plurality of fields;
generating a plurality of field definitions associated with the plurality of fields, based on the digital form;
generating a character string by applying a speech recognition algorithm to audio data comprising a user's speech;
recognizing a plurality of target keywords in the character string;
extracting a plurality of sub-strings from the character string based on the target keywords;
generating a numerical score by analyzing each sub-string for compliance with each of the plurality of field definitions, where each of the plurality of field definitions comprises a field name and a data type and corresponds to one of the plurality of fields in the digital form, where each sub-string is analyzed in real-time while the user speaks; and
populating a plurality of the fields in the digital form based on the numerical score generated during the analysis of each sub-string for compliance with each of the plurality of field definitions.

13. The computing device of claim 12, where each of the plurality of field definitions further comprises a size limit.

14. The computing device of claim 12, where the plurality of field definitions further comprises target keywords associated with the plurality of fields in the digital form.

15. The computing device of claim 12, where analyzing each sub-string for compliance with each of a plurality of field definitions comprises applying a pattern-recognition algorithm to the sub-strings and the field definitions.

16. The computing device of claim 15, where the pattern-recognition algorithm is generated using machine learning.

17. The computing device of claim 15, where the method further comprises retrieving the pattern-recognition algorithm.

18. The computing device of claim 17 where the pattern-recognition algorithm is retrieved from a remote server.

19. The computing device of claim 17 where the pattern-recognition algorithm is retrieved from the non-transient memory.

20. The computing device of claim 12, where populating the plurality of the fields in the digital form occurs in real-time while the user speaks.

21. The computing device of claim 12 where the digital form is retrieved from a remote server.

22. The computing device of claim 12 where the digital form is retrieved from the non-transient memory.

\* \* \* \* \*